US011250286B2

(12) United States Patent
Ross (10) Patent No.: US 11,250,286 B2
(45) Date of Patent: Feb. 15, 2022

(54) AUTOMATED AUTHENTICATION REGION LOCALIZATION AND CAPTURE

(71) Applicant: ALITHEON, INC., Bellevue, WA (US)

(72) Inventor: David Justin Ross, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 67 days.

(21) Appl. No.: 16/866,468

(22) Filed: May 4, 2020

(65) Prior Publication Data

US 2020/0349379 A1 Nov. 5, 2020

Related U.S. Application Data (60) Provisional application No. 62/842,444, filed on May 2, 2019.

(51) Int. Cl.
*G06K 9/32* (2006.01)
*G06K 9/00* (2006.01)

(52) U.S. Cl.
CPC ....... *G06K 9/3216* (2013.01); *G06K 9/00671* (2013.01); *G06K 9/00684* (2013.01); *G06K 9/3233* (2013.01)

(58) Field of Classification Search
CPC ............. G06K 9/3216; G06K 9/00671; G06K 9/00684; G06K 9/3233; G06K 9/036; G06K 9/3258
See application file for complete search history.

(56) References Cited

U.S. PATENT DOCUMENTS

| 4,218,674 A | 8/1980 | Broscow et al. |
| 4,423,415 A | 12/1983 | Goldman |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

Farid, "Digital Image Forensics," Dartmouth CS 89/189, Sprint 2013, 199 pages.

(Continued)

*Primary Examiner* — Ming Y Hon
(74) *Attorney, Agent, or Firm* — Cozen O'Connor (57) ABSTRACT

A device includes a processor, a machine-readable memory, and an optical capture device coupled to the processor. The machine-readable memory, which is accessible to the processor, stores processor-executable instructions and data. The processor is configured to perform certain operations responsive to execution of the processor-executable instructions. The certain operations include capturing image data of a first region of a physical object using the optical capture device. The captured image data includes an anchor region. The certain operations also include determining whether the captured image data at least meets a predetermined level of image quality, and in a case that it does, locating an authentication region in the captured image data based on the anchor region. The certain operations also include authenticating the object based on the captured image data in the authentication region, generating a result of the authenticating, and outputting the result to a user interface of the mobile device.

11 Claims, 4 Drawing Sheets

(56) References Cited

U.S. PATENT DOCUMENTS

| | | |
|---|---|---|
| 4,677,435 A | 6/1987 | Causse D'Agraives et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Baehrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,596 B2 | 6/2016 | Ross et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,936,838 B1 * | 3/2021 | Wong .............. H04L 9/0866 |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0179931 A1 | 9/2003 | Sun |
| 2003/0182018 A1 | 9/2003 | Snapp |
| 2003/0208298 A1 | 11/2003 | Edmonds |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1 | 1/2005 | Monk et al. |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0282900 A1 | 12/2007 | Owens et al. |
| 2008/0011841 A1 | 1/2008 | Self et al. |

(56) References Cited

U.S. PATENT DOCUMENTS

| | | |
|---|---|---|
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2011/0026831 A1 | 2/2011 | Perronnin et al. |
| 2011/0049235 A1* | 3/2011 | Gerigk ............... G07D 7/2033 235/380 |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0244481 A1 | 9/2012 | Gernandt et al. |
| 2012/0243797 A1 | 9/2012 | Dayer et al. |
| 2012/0250945 A1 | 10/2012 | Peng et al. |
| 2013/0214164 A1 | 8/2013 | Zhang et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0201094 A1 | 7/2014 | Herrington et al. |
| 2014/0184843 A1 | 9/2014 | Campbell et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0078629 A1 | 3/2015 | Gottemukkula et al. |
| 2015/0086068 A1 | 3/2015 | Mulhearn et al. |
| 2015/0110364 A1* | 4/2015 | Niinuma ............ G06K 9/00255 382/116 |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034913 A1* | 2/2016 | Zavarehi ............ G06Q 30/0185 235/462.25 |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1* | 3/2016 | Kouladjie ............... G06F 21/36 713/189 |
| 2016/0117631 A1 | 4/2016 | McCloskey et al. |
| 2016/0180546 A1 | 6/2016 | Kim et al. |
| 2016/0189510 A1 | 6/2016 | Hutz |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1* | 11/2017 | Withrow ................. G06F 21/30 |
| 2017/0344824 A1* | 11/2017 | Martin ................... G06K 9/036 |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0279017 A1* | 9/2019 | Graham ............... G06Q 20/208 |
| 2019/0287118 A1 | 9/2019 | Ross et al. |
| 2019/0362186 A1* | 11/2019 | Irshad ..................... G08G 1/04 |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |
| 2020/0356751 A1* | 11/2020 | Matsuda ............ G06K 9/00013 |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| GB | 2097979 A | 11/1982 |
| GB | 2482127 | 1/2012 |
| JP | S61234481 A | 10/1986 |
| JP | 2007213148 A | 8/2007 |
| KR | 20120009654 A | 2/2012 |
| WO | WO2005086616 A2 | 9/2005 |
| WO | WO2006038114 A1 | 4/2006 |
| WO | WO2007002799 A1 | 3/2007 |
| WO | WO2007031176 A1 | 3/2007 |
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | WO2010018464 A2 | 2/2010 |
| WO | WO2012145842 A1 | 11/2012 |
| WO | WO2013126221 A1 | 8/2013 |
| WO | WO2013173408 A1 | 11/2013 |
| WO | WO2015004434 A1 | 1/2015 |
| WO | WO2016081831 A1 | 5/2016 |

OTHER PUBLICATIONS

Huang et al., "A Novel Binarization Algorithm for Ballistic Imaging Systems," 3rd International Congress on Image and Signal Processing, Yantai, China, Oct. 16-18, 2010, pp. 1287-1291.

(56) References Cited

OTHER PUBLICATIONS

Huang et al., "An Online Ballistics Imaging System for Firearm Indentification," 2nd International Conference on Signal Processing Systems, Dalian, China, Jul. 5-7, 2010, vol. 2, pp. 68-72.

Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.

Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, downloaded date Jun. 25, 2010, 2 pages.

Smith, "Fireball: A Forensic Ballistic Imaging System: Proceedings of the 31st Annual International Carnahan Conference on Security Technology," Canberra, Australia, Oct. 15-17, 1997, pp. 64-70.

United States Postal Service, "NCOALink® Systems," download date Jun. 23, 2010, 2 pages. URL=http://web.archive.org/web/20100724142456/http://www.usps.com/ncsc/addressservices/moveupdate/changeaddress.htm.

United States Postal Service Publication 28 "Postal Addressing Standards", dated Jul. 2008; text plus Appendix A only; 55 pages.

Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.

Beckhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Di Paola et al., "An Autonomous Mobile Robotic System for Surveillance of Indoor Environments," International Journal of Advanced Robotic Systems 7(1): 19-26, 2010.

Fischler et al., "Random Sample onsensus: A Paradigm for Model Fitting with Applications to Image Analysis and Automated Cartography," Communication of the ACM 24(6); 381-395, 1981.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Maddern et al., "Illumination Invariant Imaging: Application in Robust Vision-based Localization, Mapping and Classification for Autonomous Vehicles," IEEE International Conference on Robotics and Automation, Hong Kong, China, May 31-Jun. 7, 2014, 2014, 8 pages.

Matsumoto et al., "Nano-artifact metrics based on random collapse of resist," Scientific Reports 4:6142, 2014 (5 pages).

Ruhlee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Shi et al., "Smart Cameras: Fundamentals and Classification," Chapter 2, Belbachir (ed.), Smart Cameras, Springer, New York, New York, USA 2010, pp. 19-34.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

Veena et al., "Automatic Theft Security System (Smart Surveillance Camera)," Computer Science & Information Technology 3:75-87, 2013.

United States Postal Services, NCOALink® Systems, dated May 27, 2009, URL=http://ribbs.usps.gov/ncoalink/ncoalink_print.htm, download dated Jun. 23, 2010, 3 pages.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How To Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages.

Entrupy.com Website History, Wayback Machine; https://web.archive.org/web/20160330060808/https:www.entrupy.com/; Mar. 30, 2016 (Year: 2016), 5 pages.

Anonymous, "Intrinsic Characteristics for Authentication" & "AlpVision Advances Security Through Digital Technology," Authentication News vol. 12, (No. 9) pp. 2, 7, and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

\* cited by examiner

AUTOMATED AUTHENTICATION REGION LOCALIZATION AND CAPTURE

PRIORITY CLAIM

This application is a non-provisional of, and claims priority pursuant to 35 U.S.C. § 119(e) (2012) to U.S. provisional application No. 62/842,444 filed May 2, 2019, hereby incorporated by reference as though fully set forth.

COPYRIGHT NOTICE

COPYRIGHT© 2011-2020 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d) (2017).

BACKGROUND

Technical Field

The present disclosure pertains to systems, methods, and apparatus associated with digital fingerprints generated with data extracted from a digital image of an authentication region on a physical object. More particularly, but not exclusively, the present disclosure relates to scanning, processing, and repository (e.g., database) techniques to capture image data of an anchor region of the physical object and acquire the digital image of the authentication region based on the captured image data of the anchor region.

Description of the Related Art

Some aspects of technologies and related art that may be useful in understanding the present disclosure are described in the following publications, which are each incorporated herein by reference in their respective entireties:

U.S. patent application Ser. No. 15/862,556, which is also published U.S. Patent Publication No. 2018/0144211 A1 by Ross et al., which describes, among other things, a database for detecting counterfeit items using digital fingerprint records;

U.S. patent application Ser. No. 13/618,362, which is also U.S. Pat. No. 9,152,862 by Ross et al., which describes, among other things, embodiments of digital fingerprinting;

U.S. patent application Ser. No. 14/531,724, which is also U.S. Pat. No. 9,443,298 B2 by Ross et al., which describes, among other things, digital fingerprinting object authentication and anti-counterfeiting systems;

U.S. patent application Ser. No. 15/436,631, which is also U.S. Pat. No. 10,037,537 B2 by Withrow et al., which describes, among other things, personal history in track and trace systems; and U.S. patent application Ser. No. 15/436,616, which is also U.S. Pat. No. 10,346,852 by Ross et al., which describes, among other things, embodiments of preserving authentication under item change.

Many different approaches have been tried to uniquely identify and authenticate physical objects, including labelling and tagging strategies using serial numbers, bar codes, holographic labels, RFID tags, and hidden patterns using security inks or special fibers. All of these methods can be duplicated, and many add a substantial extra cost to the production of the goods sought to be protected. Moreover, physical labels and tags may be lost, modified, or stolen, and the physical marking of certain objects such as artwork, gemstones, and collector-grade coins may damage or destroy the value of the object.

A need remains for solutions that enable the efficient, accurate determination of an object's identity or authenticity that does not rely on the addition of some otherwise unnecessary attribute to the physical object.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

Certain embodiments demonstrating the art of applying digital fingerprint technologies to identify and authenticate a physical object have already been disclosed in many publications by the present inventive entity. As disclosed in these publications, digital fingerprints are generated from data in a digital image. The digital image is taken of an authentication region of the physical object to be identified or authenticated. The authentication region is an area of the physical object having sufficient natural structures from which object features may be extracted and from which feature vectors may be formed. It is recognized, however, that a suitable authentication region on a physical object may not be readily apparent to a human or machine-system arranged to capture the digital image data. Hence, the device, method, and system embodiments described in this disclosure (i.e., the teachings of this disclosure) determine a readily discernible anchor region of the physical object—and use the anchor region to automatically localize the authentication region of the physical object.

This disclosure teaches using a feature or features on a physical object as the "anchor region" or "anchor regions" to locate, triangulate, or otherwise identify the authentication region or authentication regions of the object.

Concurrently, the processing of the anchor region data provides substantial confidence that the digital image of those authentication regions is adequate for extraction of authentication data. These new techniques of capturing images of an object and extracting authentication data from that digital image data, which is sometimes referred to as "digital fingerprinting," are described in more detail herein.

In this disclosure, examples are given that involve the use of image-based authentication features such as are known in machine-based understanding of images. However, it is to be understood that any suitable image-based forms of authentication are in view.

This disclosure has in view, in one embodiment, a process of capturing an image of an anchor region, verifying adequate quality of that captured image, and then automatically extracting authentication data from an authentication region that is also visible in the captured image.

In another embodiment, a system processes anchor region image data to extract a location of an authentication region of interest and, if the authentication region is not included in the captured image of the anchor image, the system directs a user or processor-executable application as to where and/or how to capture an image of the authentication region of interest. In these or other embodiments, a process may include accessing a database, based on data extracted from the anchor region image, to acquire offset information. The offset information is used to locate the authentication region of interest and to extract authentication information from digital image data of the authentication region.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

In order to describe the manner in which the above-recited and other advantages and features of the disclosure can be obtained, a more particular description follows by reference to the specific embodiments thereof which are illustrated in the appended drawings. Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings.

Understanding that these drawings depict only some embodiments of the present disclosure and are not therefore to be considered to be limiting of its scope, one or more embodiments of the present disclosure will be described and explained with additional specificity and detail through the use of the accompanying drawings in which.

DETAILED DESCRIPTION

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

Improvements to digital fingerprint technology are taught in the present disclosure. Digital fingerprints, as the term is used herein, can be utilized in many practical applications including the identification, authentication, and tracking of physical objects. Rather than repeating each potential application, the present disclosure is simplified by interchangeably using the terms, "authenticate" and "identify," along with their cognates. One of skill in the art will recognize that unless the context dictates otherwise, various acts described with respect to the authentication of a physical object may also be applied to the identification of a physical object, the tracking of a physical object, and the performance of other like acts associated with the physical object. And along these lines, acts described with respect to identifying a physical object may also be applied to authenticating, tracking, and performing other like acts associated with the physical object.

Many different approaches have been tried to uniquely identify and authenticate objects, including labelling and tagging strategies using serial numbers, bar codes, holographic labels, RFID tags, and hidden patterns using security inks or special fibers. All of these methods can be duplicated, and many add a substantial extra cost to the production of the goods sought to be protected. Nevertheless, these labels, tags, and other areas of a physical object may be used as an "anchor region" (e.g., a reference point) to locate an authentication region on the physical object.

The device, method, and system embodiments described in this disclosure (i.e., the teachings of this disclosure) enable a human or machine-based entity to: 1) capture digital image data of an anchor region of a physical object, 2) from that anchor-region-digital-image-data, automatically locate an authentication region on the physical object, 3) determine whether the anchor-region-digital-image-data includes sufficient authentication-region-digital-image-data and if not, then capture authentication-region-digital-image-data, and 4) generate at least one digital fingerprint from the authentication-region-digital-image-data.

The term "digital fingerprint" in all its grammatical forms and constructs, is used throughout the present specification and claims to refer to a computationally unique digital identifier of a physical object or a portion of a physical object. To the limitations of the available computational resources, each and every digital fingerprint identifying a determined portion of a physical object is different from each and every other digital fingerprint identifying a different physical object or identifying a different portion of the same physical object. And to the limitations of the available computational resources and the preservation of the determined portion of the physical object on which a first digital fingerprint is generated, each and every subsequent digital fingerprint identifying the same determined portion of the same physical object is statistically the same as the first digital fingerprint. In at least some cases, a digital fingerprint, as the term is used herein, is generated in a method that includes acquiring a digital image, finding points of interest within that digital image (e.g., generally, regions of disparity where "something" is happening, such as a white dot on a black background or the inverse), and characterizing those points of interest into one or more feature vectors extracted from the digital image. Characterizing the points of interest may include assigning image values, assigning or otherwise determining a plurality of gradients across the image region, or performing some other technique. The extracted feature vectors may or may not be analyzed or further processed. Instead, or in addition, the extracted feature vectors that characterize the points of interest in a region are aggregated, alone or with other information (e.g., with location information) to form a digital fingerprint.

In embodiments of the present disclosure, digital fingerprinting includes the creation and use of digital fingerprints derived from properties of a physical object. The digital fingerprints are typically stored in a repository such as a register, a physical memory, an array, a database, data store, or some other repository. Storing the digital fingerprint in the repository may include, or in some cases be referred to as, inducting the respective physical object into the repository. Digital fingerprints, whether immediately generated or acquired from a repository, may be used to reliably and unambiguously identify or authenticate corresponding physical objects to an acceptable level of certainty, track the physical objects through supply chains, and record their provenance and changes over time. Many other uses of digital fingerprints are of course contemplated.

Digital fingerprints store information, preferably in the form of numbers or "feature vectors," that describe features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a repository (e.g., a database, data store, memory, or the like) to an object. Thus, in general, a digital fingerprint may be derived from a first object directly, or it may be derived from a different object (e.g., a file) linked to the first object, or a combination of two or more sources. In the audio example, the audio file may be a recording of a person speaking a particular phrase. The digital fingerprint of the audio recording may be stored as part of a digital fingerprint of the person speaking. The digital fingerprint (e.g., the digital fingerprint of the person) may be used as part of a system and method to later identify or authenticate that person, based on their speaking the same phrase, in combination with other sources.

Returning to the 2-D and 3-D object examples discussed herein, feature extraction or feature detection may be used to characterize points of interest. In an embodiment, this may be done in various ways. Two examples include Scale-Invariant Feature Transform (or SIFT) and Speeded Up Robust Features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB, etc. SIFT and SURF are most useful approaches to detect and matching of features because of it is invariant to scale, rotate, translation, illumination, and blur." MISTRY, Darshana et al., Comparison of Feature Detection and Matching Approaches: SIFT and SURF, GRD Journals-Global Research and Development Journal for Engineering | Volume 2 | Issue 4 | March 2017.

In an embodiment, features may be used to represent information derived from a digital image in a machine-readable and useful way. Features may comprise point, line, edges, blob of an image, etc. There are areas such as image registration, object tracking, and object retrieval, etc., that require a system or processor to detect and match correct features. Therefore, it may be desirable to find features in ways that are invariant to rotation, scale, translation, illumination, and/or noisy and blurred images. The search of interest points from one object image to corresponding images can be very challenging work. The search may preferably be done such that the same physical interest points may be found in different views. Once located, points of interest and their respective characteristics may be aggregated to form a digital fingerprint, which may include 2-D or 3-D location parameters.

In an embodiment, features may be matched, for example, based on finding a minimum threshold distance. Distances can be found using Euclidean distance, Manhattan distance, or other suitable metrics. If distances of two points are less than a prescribed minimum threshold distance, those key points may be known as matching pairs. Matching a digital fingerprint may comprise assessing a number of matching pairs, their locations, distance, or other characteristics. Many points may be assessed to calculate a likelihood of a match, since, generally, or at least in some cases, a perfect match will not be found. In these cases where a perfect match is not found, a match may still be asserted when the features are matched to within a predetermined similarity threshold or some other acceptable level of confidence. In some applications a "feature template" may be used to define locations or regions of interest for a class of objects.

The term, "induction," as used in the present disclosure, refers to acts that include generating and storing, or otherwise acquiring access to, at least one digital fingerprint of a physical object, and storing the one or more digital fingerprints in a repository. Each stored digital fingerprint may be communicatively linked (i.e., associated) with other information related to the physical object. Hence, induction may also include acts that store additional information related to the physical object in a same or different repository. The additional information may be stored in association with any number of digital fingerprints. The association may include storing associated data in a common or shared repository record, communicatively linking one or more repository records together, or via other techniques known in the art to link information. For the sake of illustration and not limitation, induction may include storing one or more digital fingerprints in a new or existing repository record and further storing some other type of information, whether related to one or both of the physical object and the digital fingerprint, in a same or linked repository record.

Scanning

In the present disclosure, the term, "scan," in all of its grammatical forms, refers illustratively and without limitation to any and all means for capturing scan data, including an image or set of images, which may be in digital form or transformed into digital form. Images may, for example, be two dimensional (2-D), three dimensional (3-D), or in the form of video. Thus, a scan may refer to a collection of scan data, including one or more images, or digital data that defines such an image or images, captured by a scanner, a camera, an imager, a 3D-sense device, a LiDAR-based device, a laser-based device, a specially adapted sensor or sensor array (e.g., a CCD array), a microscope, a smartphone camera, a video camera, an x-ray machine, a sonar, an ultrasound machine, a microphone (i.e., any instrument for converting sound waves into electrical energy variations), and the like. Broadly, any device that can sense and capture either electromagnetic radiation or a mechanical wave that has traveled through an object or reflected off an object, or any other means to capture surface or internal structure of an object, is a candidate to create a scan of an object.

Various means to extract features from an object may be used. For example, features may be extracted through sound, physical structure, chemical composition, or many other means. Accordingly, while the term, images, and cognates of the term, images, are used to form the digital fingerprints described herein, the broader application of scanning technology will be understood by those of skill in the art. In other words, alternative means to extract features from an object and to generate a digital fingerprint that uniquely identifies the object should be considered equivalents within the scope of this disclosure. Along these lines, terms such as "scanner," "scanning equipment," "sensor," "sensor array," and the like as used herein may be understood in a broad sense to refer to any equipment capable of carrying out scans as described above, or to equipment that carries out scans as described above, as part of their function to produce sensor data (e.g., scan data, image data, x-ray data, acoustic data, ultrasound data, audio data, or the like).

When capturing digital images that will be used to perform an authentication of a physical object, it is desirable that the authentication regions be properly illuminated, in proper focus, properly located, and-in some cases properly sized and oriented. By providing these circumstances during a scan of the physical object, the authentication process is more likely to be supplied with serviceable data. Since the information used for authentication is often very different from what is acted on by human perception, it can be hard for a user to tell when a digital image of an authentication region is adequate. This can be particularly difficult to achieve in many cases, such as where the object in question is not flat (e.g., the label on a wine bottle), where the object has image regions of substantially different contrast (e.g., a passport with a photograph, regions of text, and regions of background), or where the object has regions lacking features that humans are used to reading or understanding (e.g., if the authentication region only contains paper fibers).

The problem of poorly imaged authentication regions is made more acute by the desire to use inexpensive capture equipment, such as the camera on a smartphone, which may have limited depth of field, contrast sensitivity, and so on, and whose distance and orientation with respect to the object may not be accurately known. If there is no information provided as to where on the object the authentication region is located, the user is constrained to guess, and such guessing with regard to capturing the digital image data might result in the digital image of the authentication region being missed or out of focus. Alternatively, or in addition, such guessing may cause the user to image the entire object, which may result in an image of insufficient resolution to provide good authentication. In some cases, it might be impossible to clearly generate digital image data of all possible locations of the authentication regions (e.g., of the label on a curved wine bottle) at the same time.

Characteristics of an authentication region that improve the usefulness of the region for authentication may not be apparent to the human eye. It may also be difficult to teach a software application (e.g., a machine visual application, an artificial intelligence application, or the like) how to determine such characteristics. For example, it is difficult to direct a smart phone camera application to clearly capture a focused digital image of the paper fibers of a wine label. In cases where there is no feedback to the user and/or the application, the determination of whether or not the digital image data of the authentication region is sufficient may, therefore, become a matter of chance, and multiple attempts to capture adequate digital image data of the authentication region may be required. As a result of the poor digital image data quality, the ability to determine with an acceptable level of confidence that authentication has been achieved or that an authentication has failed can become very difficult. If, in particular, the original digital image of the physical object that was analyzed when the object was first inducted into a repository (i.e., the induction image of the object) and the later captured digital image of the purported physical object (i.e., the authentication image) have different areas in clear focus, it is likely that any authentication of the physical object will be weak or nonexistent. Without prompting, it is in at least some cases not possible for a user in the field who is performing an authentication to know what area of the physical object was in focus (i.e., captured in a digital image) when the object was originally inducted. Using current techniques, the user who is trying to authenticate the object makes any number of guesses as to what parts of the object should be imaged to produce sufficiently detailed digital images on which to perform the authentication. What's more, if the physical object that the user is trying to authenticate has never been inducted, then the user may not be able to know whether the digital image data quality prevented induction or whether the object had never yet been inducted. Hence, the need remains for better solutions to address these and related problems.

Anchor regions on a physical object are regions of the physical object that are more easily recognized by a human user or a computer-based application. Anchor regions may be inherent features of the object itself (e.g., the name of a vintner on a wine label), anything added or incorporated for the purpose (e.g., an "AUTHENTICATED BY ALITHEON" seal), or any other structure or characteristic that is easy or intuitive to locate, preferably through training or other means. In at least some cases, the anchor region or anchor regions are easily located by the naked eye. A large number and variety of methods that find: 1) one or more anchor regions, 2) one or more authentication regions, and/or 3) the relationships among the anchor regions and authentication regions are in view in this disclosure.

One notable aspect of this disclosure is the use of one or more areas on an object (e.g., one or more first "anchor regions") to identify other or possibly the same regions on the object (e.g., one or more second anchor regions or "authentication regions"). The capture and contents in digital image data of the first anchor region provide information on a second anchor region or an authentication region on the object that can be used for authentication of the object.

The regions on the physical object whose digital image data is used for authentication may be termed "authentication regions of interest" or "authentication regions." In general, the anchor regions may be easier or more intuitive to locate. In addition, in at least some cases, the anchor regions are less suitable for authentication than the authentication regions of interest.

To facilitate capture of adequate digital image data of physical objects users are trying to authenticate, feedback may be provided to users regarding the quality of the digital image data captured by each user. For example, an indication that the digital image data was adequately captured for authentication analysis or an indication the digital image data is not adequate for authentication analysis and must be recaptured. The indications may be generated based on the quality of the digital image data as whole and or based on the quality of one or more anchor regions within the digital image data.

In one exemplary process, quality indications may be generated by, processing digital image data of a physical object and or a particular portion of the digital image data to locate an anchor region. For example, processing a portion of digital image data of a wine bottle that contains the label to locate a first anchor region included in the label. One or more quality metrics describing a property of the portion of digital image data including the first anchor region may then be generated. The one or more quality metrics may include a qualitative or quantitative description of the clarity, focus, resolution, contrast, illumination, or other properties of the portion of digital image data. For example, the one or more quality metrics may comprise at least one of: clarity of focus of a portion of the digital image data including the anchor region, an illumination of the portion of the digital image data including the anchor region, a size of the portion of the digital image data including the anchor region, or an orientation associated with the portion of the digital image data including the anchor region. The quality of the portion of digital image data may then be assessed by comparing one or more of the quality metrics to a predetermined threshold. If the one or more quality metrics of the portion of digital image data satisfy the predetermined threshold, the digital image data of the anchor region may be determined to be adequately captured. When digital image data of the anchor regions is adequately captured, the related regions of interest (e.g., one or more second anchor regions or authentication regions) will generally be captured as well, either at the same time, which may be the general case, or as a result of using data sent back from a database whose access is triggered by capturing and processing the anchor region(s). In the latter case, in response to determining the digital image data of the anchor region is adequately captured, a reference database may be accessed to retrieve a repository (e.g., database) record may provide "instructions" for where and how to capture the one or more authentication regions of interest. For example, a repository record describing how to locate an authentication region in the portion of digital image data may be accessed using data of the anchor region. The repository region may include offset information that locates the authentication region in the portion of digital image data.

If the one or more quality metrics fails to satisfy the predetermined threshold, the portion of the digital image data may automatically be re-imaged to capture re-imaged digital image data of the anchor region. Instructions to re-capture a second portion of digital image data including the anchor region may also be generated and provided to the user, in response to determining one or more quality metrics for the portion of digital image data do not satisfy the predetermined threshold. Once the digital image data is re-imaged and or the second portion of digital image data is captured, one or more quality metrics for the re-imaged digital image data and or the second portion of digital image data may be generated. The one or more quality metrics for the re-imaged digital image data and or the re-captured second portion of digital image data may describe one or more properties of the digital image data as described above. To determine if the re-imaged digital image data and or the second portion of the digital image data is adequately captured, the one or more metrics may be compared to a predetermined threshold. If the one or more quality metrics for the re-imaged digital image data and or the second portion of the digital image data satisfies the predetermined threshold, a reference datastore may be accessed based on data of the anchor region to obtain offset information that locates the authentication region in the re-imaged digital image data of the anchor region or the second portion of the digital image data of the anchor region.

Other quality indications that may be provided during the capture process to ensure the digital image data is accurately captured relate to the placement of one or more authentication regions in digital image data captured by the scanner. To determine if the digital image data is adequately captured, the authentication region within the portion digital image data, the re-imaged digital image data, and or the second portion of digital image data may be assessed. If the authentication region is within view of the portion of digital image data, the re-imaged digital image data, and or the second portion of digital image data, it may be determined that the portion of digital image data, the re-imaged digital image data, and or the second portion of digital image data is adequately captured. The authentication region within the portion of digital image data, the re-imaged digital image data, and or the second portion of digital image data may then be used for feature extraction.

If the authentication region is not within view of the portion of digital image data, the re-imaged digital image data, and or the second portion of digital image data, feedback for the scanner and or a user of the scanner may be generated. The feedback may include an indication that the authentication region is not within view of the portion of digital image data, the re-imaged digital image data, and or the second portion of digital image data and or instructions causing the scanner to automatically obtain and or user of the scanner to obtain, based on the offset information, next digital image data representing an image of a second region of the physical object that includes a location corresponding to the authentication region and or a second authentication region. The image of the second region of the physical object may then be processed to locate a second anchor region in the image of the second region. One or more quality metrics of the next digital image data of the second anchor region may then be generated The one or more quality metrics may then be compared to a predetermined threshold.

If the one or more quality metrics satisfy one or more of their respective predetermined thresholds, then the next digital image data may be determined to be adequately captured and the authentication region within the next digital image data may be used for feature extraction. If the one or more quality metrics for the next digital image data fail to satisfy one or more of their respective predetermined thresholds, an indication that the next digital image data is not adequately captured may be provided to the scanner and or a user of the scanner. In response, the scanner may automatically re-image second region and or the user may cause the second region to be re-imaged. Instructions for capturing a third portion of digital image data may also be provided to the scanner and or a user of the scanner. The third portion of the digital image data may include the second anchor region.

The one or more quality metrics for the portion of digital image data, the re-imaged digital image data, the second portion of digital image data, and of the next digital image data may also include one or more qualitative and or quantitative descriptions of whether digital image data including text has sufficient data so that the text could be successfully interpreted by object character recognition (OCR) techniques. The one or more quality metrics may also include a qualitative and or quantitative description of whether digital image data and or next digital image data includes a digital image that matches a determined template or reference within a predetermined threshold. Other quality metrics may describe whether digital image data contains a resolution pattern that is focused until a certain resolution within a predetermined threshold is found. The one or more quality metrics may also indicate whether digital image data of a bar code (e.g., a UPC code) has sufficient data such that the bar code is both readable and has a number of pixels across a stroke within a predetermined threshold. Other quality metrics may include a description of whether digital image data and or next digital image data includes a logo where features within the logo are resolved to within a predetermined threshold and or whether digital image data and or next digital image data includes a label (e.g., an "AUTHENTICATED BY ALITHEON" or other label) formed in type sufficiently small that, if it has a resolution within a predetermined threshold indicating it is readable by OCR techniques and or the human eye.

The term "capture" is further explained elsewhere in this disclosure. The terms, "capture" and "scan," and their cognates, may be used interchangeably in the present disclosure.

In a preferred embodiment, an anchor region has certain properties. First, the anchor region has a location that is clearly visible to the human eye or to an automatic computer-based application. The anchor region is easily and, in some cases, instinctually locatable. Second, there exists some acceptably simple approach to determine that the digital image of the anchor region is adequately captured, wherein adequately captured herein means that the digital image data is adequate for the purposes of the third property (described below). One non-limiting example of an adequately captured digital image is a digital image of text having sufficient data that the text could be successfully interpreted by object character recognition (OCR) techniques. Another non-limiting example of an adequately captured digital image is a digital image that matches a determined template or reference sufficiently well. A third property of an anchor region, in addition to or in place of the first and second properties, is that a process or computer-based application may automatically proceed to capturing adequate digital image data of the authentication region based on information associated with the anchor region.

In some cases, an authentication region may be the same region as the anchor region, which is preferred in at least one embodiment. In other cases, an authentication region may be different from the anchor region. In still other cases, the authentication and the anchor regions may be overlapping in whole or in part, which is preferred in one embodiment. The capture of digital image data of the authentication region may be direct or indirect.

In the direct case, one or more authentication regions are already in view, and the process of authentication proceeds without further user intervention using the already-captured anchor region digital image data. In these cases, features are extracted from the digital image data of the one or more authentication regions, and the extracted features are used, for example, to generate one or more digital fingerprints for induction of the physical object into a repository, for authentication of the physical object, or for some other purpose associated with the physical object.

In the indirect case, an associated system (e.g., a database record, a computer-based authentication system, or some other system) instructs the user or a computer-based application to capture one or more digital images of one or more locations elsewhere on the physical object. The one or more supplementary digital images are digital images of the authentication region, and the instructions to capture this supplementary image data may be made with or without reference to another anchor region. With respect to the instruction to capture digital images from elsewhere on the physical object, "elsewhere" refers to one or more locations or regions on the physical object that were not included in the initial anchor region digital image capture. The user or computer-based application captures one or more additional digital images (i.e., the supplementary digital image data) at other locations according to the instructions.

In some implementations, when digital image data of an anchor region is captured, one or more of the following acts may take place:

Feedback is provided to the user indicating whether or not the anchor region has been successfully processed.

When digital image data of the anchor region is adequately captured, a computer-based application associated with that anchor region capture process is provided with information that the one or more authentication regions of interest are also adequately captured (i.e., the direct case).

When digital image data of the anchor region is not adequately captured, a computer-based application associated with that anchor region capture process is provided with instructions to adequately capture one or more digital images of the one or more authentication regions (i.e., the indirect case).

The quality of the initially captured digital image data (e.g., the clarity of focus of the anchor region) provides an indication that the authentication regions of interest will be also be adequately captured with sufficient clarity to allow effective authentication to proceed.

Process results based on the initially captured digital image data, which may include recognition of the contents of the anchor region, may trigger a repository (e.g., database) access that provides information (e.g., location, scale, etc.) associated with the one or more authentication regions of interest, from which points of interest will be extracted for authentication. Among the information associated with the one or more authentication regions of interest that may be provided to the user or to the computer-based application are specialized instructions directing the user or computer-based application on where and how to capture or otherwise process one or more authentication regions of interest to achieve acceptably optimal authentication.

Information received back from a repository (e.g., database) query may include instructions to a camera or other imaging device to, for example, switch to infrared, apply a particular mask to the digital image, switch to a plenoptic mode, or take some other determined action to enable adequate capture of one or more authentication regions.

Figure 2:
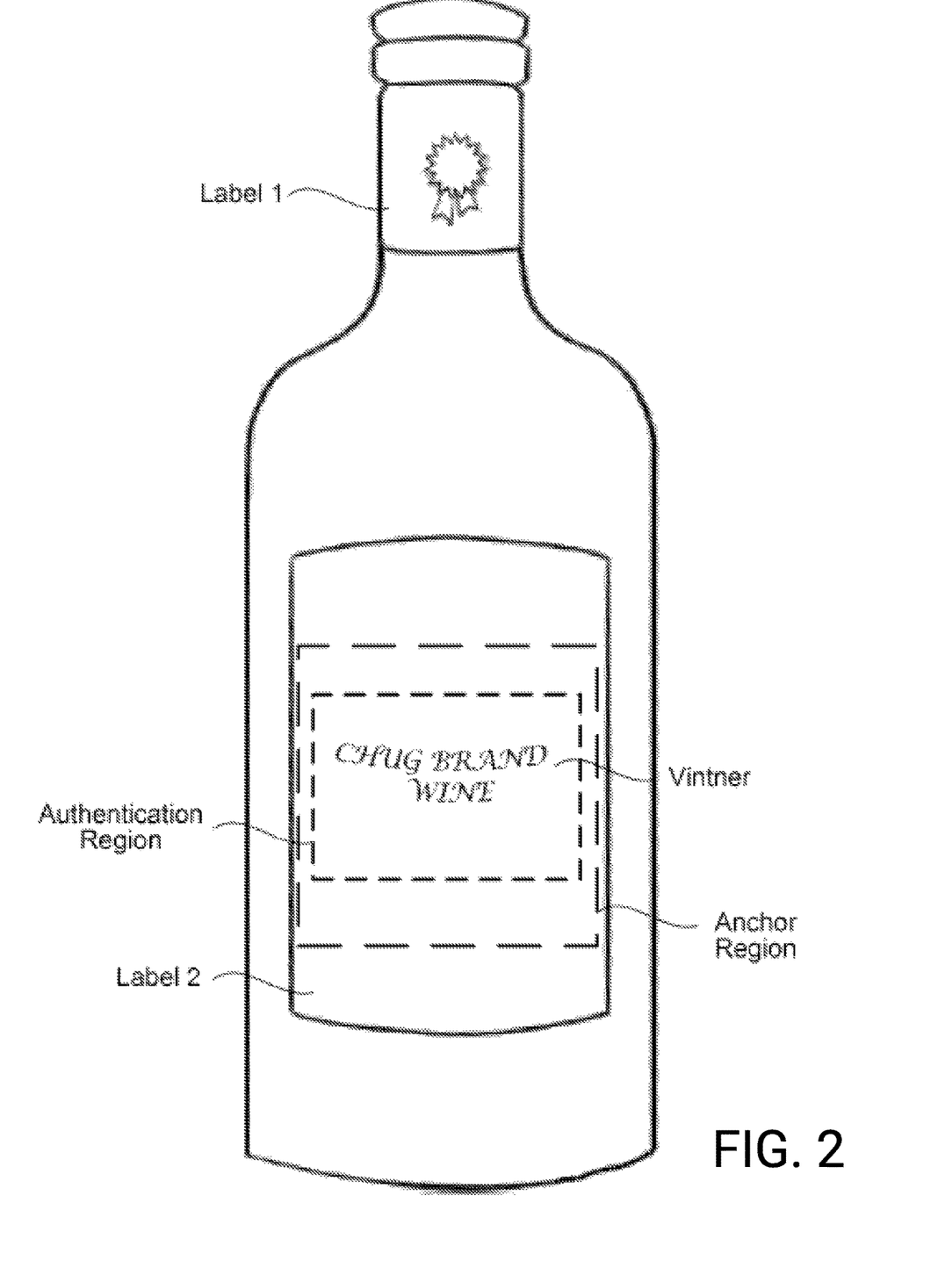
FIG. 2 is a wine bottle bearing the same two labels of FIG. 1 and illustrating the skewed vintner's name caused by the curvature of the wine bottle.

In one embodiment, an anchor region may be located within a label affixed to an object. An example of this is shown in FIG. 2, as explained herein. An area including the anchor region is captured in a digital image along with more of the label. That region in the digital image data that is "more of the label" will in some cases include the authentication region although in some circumstances it may not. A repository is accessible that contains information (e.g., instructions) indicating how a user or computer-based program is to offset from the anchor region to locate the authentication region. If the authentication region is in view in in the digital image data that has already been captured, the system performs an authentication. If the authentication region is not in view, the system communicates back to the user or computer-based program how to offset from the anchor region to locate the authentication region.

In a second embodiment, an anchor region is void of any graphic or alphanumeric content that indicates where the authentication region is located. Rather, a repository (e.g., database) holds information regarding the location of the authentication region. The location of the authentication region is retrieved from the repository based on information from the digital image data of the anchor region being presented for authentication and from having the digital image data of the anchor region as a starting point for offsetting and scaling to find the authentication region.

Thus, in this second embodiment, the process queries the repository (e.g., database) with information on what is being authenticated and with information drawn from the digital image capture of the anchor region. If the contents of the anchor region digital image data are clear enough to read or otherwise decode (e.g., text reading, bar code reading, or some other recognition), then it is presumed that the authentication region has been captured well enough to perform a serviceable authentication. From the knowledge of the kind of object that is being authenticated, and from information drawn from the contents of the anchor region digital image, a repository query retrieves information instructing a user or computer-based application where to find the authentication region. If the authentication region is included in the digital image data that has already been captured (i.e., one normal situation), then the process templates that region and processes the digital image data to form digital fingerprints. If the authentication region is not included in the digital image data that has already been captured, then information retrieved from the repository (e.g., database) prompts the user or computer-based application on how and where to capture one or more digital images of the authentication region.

A First Exemplary Embodiment

One non-limiting example is now described in which a resolution test pattern is included on a package. The test pattern may be the "anchor region."Located about one-half inch above the test pattern, on the flat surface of the package, is the "authentication region of interest" area to be captured for induction of the package into a repository and, later, for authentication of the package. The user, who may be aided by computer-based application or who may be acting manually, captures one or more digital images of the anchor region. The user or the computer-based application may change camera parameters (e.g., focus, shutter speed, flash, and the like) until the test pattern shows with acceptably sufficient resolution. The acceptably sufficient resolution may be determined by visual inspection or by an automatic process.

The user, alone or in cooperation with a computer-based authentication application, will have access to information describing or otherwise representing the offset and scale from the test pattern anchor region to the authentication region. Because the orientation and scale of the test pattern are also determined, and because a repository (e.g., database) that is accessible to the user provides information describing the offset from the test pattern to the authentication region, the user can capture a digital image of the anchor region with proper resolution that also contains the authentication region. In cases where the authentication region is not captured in the same digital image as the anchor region, the information from the repository can notify the user to reposition the camera or other scanning device in order to capture the authentication region. In at least some embodiments, a repository containing the information relating to authentication regions will be secure.

The first exemplary embodiment may include any suitable number of parameters. For example, the physical object or portions thereof that is imaged is non-limiting, how information about the physical object is determined is non-limiting, how the offset, scale, and other parameters of digital imagery are calculated is non-limiting, and the express acts of generating digital fingerprints, induction, authentication, tracking, and other acts may vary considerably and are also non-limiting. Certain methods of accomplishing each of these things are known to one of skill in the art and not described in detail herein. Other teaching, however, is described in detail. For example: when one or more digital images of one or more anchor regions in the exemplary test pattern are adequately captured, the results of that capture either provide adequate capture of the one or more authentication regions or provide sufficient detail so that instructions to adequately capture one or more digital images of the one or more authentication regions can be rendered. In other words, one region, which can be easily or intuitively located, brought into focus, oriented, and the like by a human or computer-based application, acts as a stand-in for, and guide to, capturing one or more digital images of another region that is more useful for authentication, but which may be much more difficult to adequately capture on its own. The anchor regions and authentication regions may, of course, be the same region. For example, a bar code may serve as the anchor region, and ink bleeds from the bar code may contain the features used for authentication.

Further Exemplary Embodiments

The following exemplary embodiments are non-limiting. The following exemplary embodiments illustrate both a range of the current problem solved by the inventor and a range of exemplary solutions taught in the present disclosure.

Figure 1:
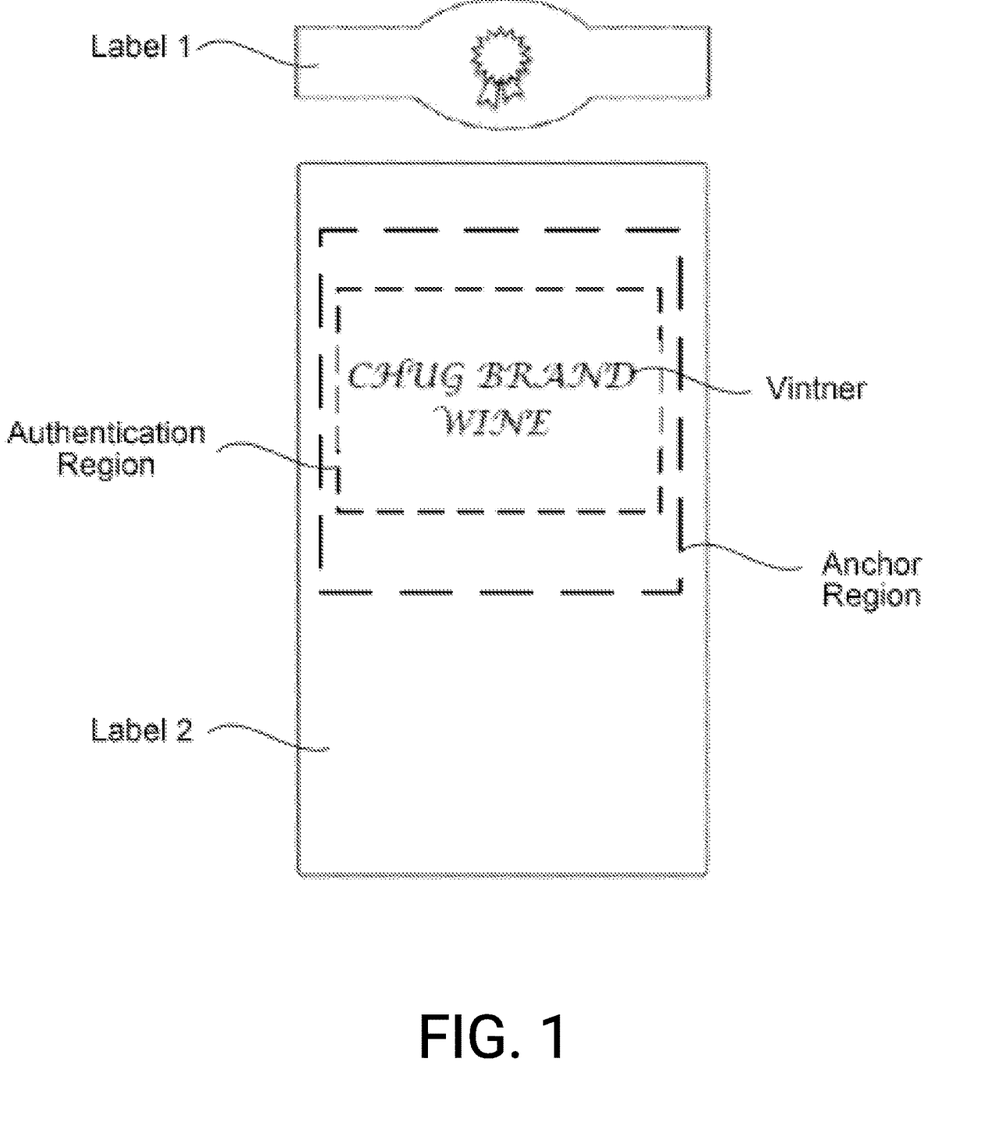
FIG. 1 illustrates two wine bottle labels; one of the labels having a delineated anchor region and a delineated authentication region defined when the label is flat.

Another illustrative example is directed toward the authentication of a wine bottle by use of the label on the wine bottle. FIG. 1 illustrates a first Label 1 of a wine bottle neck and a second Label 2 of a wine bottle body. The first Label 1 has an "award" image on it, in this example, a star with a ribbon. The second Label 2 has text or any other markings, in this case, the name of the vintner, "CHUG BRAND WINE". An authentication includes all of the text of the vintner's name, but this is not required. The Label 2 also has an anchor region, as named in the FIG. 1. The anchor region includes the entire authentication region and some additional parts of Label 2 that are outside of the authentication region. In some embodiments, this part of the authentication region that is outside of the anchor region may or may not have additional text, figures, images, or icons, which are not shown in FIG. 1 for simplicity in the drawing.

The label of the wine bottle may be adequately captured in one or more digital images, which are used to generate digital fingerprints that are inducted into a repository prior to application of the label to the bottle. In this example, the induction process may be conducted when the label is flat, as shown in FIG. 1, while later authentication may take place after the label has been applied to the bottle, as shown in FIG. 2. On a first Label 1 is an image and on a second Label 2 is the name of the vintner, which serves as at least part of the anchor region. The authentication region is determined, by some known method, to be a one-half inch square area located one inch above the vintner's name and centered on the vintner's name. This location might have been chosen for any of a number of reasons, one of which is that if the vintner name is in focus after the label is applied to the bottle, then the authentication area is also likely to be in focus. One of skill in the art will recognized the variety of manners in which the one or more anchor regions may be communicated to a user, and the methods by which one or more authentication regions may be determined.

At induction, an area containing both the vintner name and the authentication region may be adequately imaged by a high-end scanner such that both the vintner name and the authentication region are in sufficiently sharp focus. A template may be applied, and the authentication region may be converted into a set of feature points whose feature vectors are entered into a reference repository (e.g., database) along with any desired metadata relating to the bottle of wine. Details, such as how the authentication region is determined, what metadata is tied to the wine bottle records stored in the repository, whether authentication is one-to-one (e.g., as in cases where there is, for example, a serial number) or one-to-many (e.g., as in cases where there is, for example, a region of the vineyard where grapes were harvested to make several bottles of wine), what data is in a template or how the data from the template is applied, how the reference repository (e.g., database) is accessed, and other such details may be implemented in many ways, all of which details are in view here. During induction, dozens, hundreds, thousands, or any number of labels can be individually inducted into the system by scanning rapidly, then generating and storing one or more digital fingerprints for each label.

As shown in FIG. 2, when the wine bottle having a label thereon that has been inducted is to later be authenticated, the user will capture one or more digital images that include the vintner name on the label and a region around that portion of the label. In some cases, a computer-based application may be employed to drive the camera or other scanning unit until sufficiently clear, sharp, and recognizable imagery of the vintner's name is adequately captured.

FIG. 2 illustrates the labels of FIG. 1 applied to a wine bottle. As can be seen, Label 1 is placed around the neck of the bottle and fully wraps around the neck. The two ends of label 1 overlap each other, with one end covering the other end, not shown in FIG. 2, but which can easily be understood. Thus, part of Label 1 that was fully viewable and imaged in FIG. 1 is hidden, cannot be seen, and is not present in any images taken in FIG. 2. In addition, the image on Label 1, which in this instance, is a star with a ribbon, is spread out more and slightly enlarged due to being placed on the curved neck of the bottle. The image on the Label 1 from FIG. 1 is now distorted. The improvements as disclosed herein, can also provide techniques to properly recognize the same Label 1 after it is applied to the bottle and distorted or changed in shape.

Label 2 is placed on the main body of the bottle. The text, in this instance, the name of the vintner, is distorted because of the curve of the bottle. The Label 2 has an anchor region and an authentication region that are also distorted because of the curve of the bottle. Despite the distortion, the image of the anchor region can be used to locate the authentication region. The Label 2 that was digitally fingerprinted when the label was flat in FIG. 1 can be confirmed to be the same Label 2 that is shown in FIG. 2, even though the text and other parts of the Label are significantly distorted.

In this example, the simple transition of putting a flat label on a curved wine bottle is shown for ease of understanding. As can be appreciated, the label may start in any shape, flat, curved, bent, etc. and can be changed into any other shape, whether crumpled, bent on itself, as was done with Label 1, wrinkled, coupled to thin wire as a tag, to a corrugated surface, or put into any other irregular shape.

Several possible approaches to determine that the quality of the one or more captured digital images is sufficient, including measuring focus, determining the quality of object character recognition (OCR) on the vintner name, the human user's ability to determine that the image is "clear," and other such approaches. If the quality is determined to be inadequate, a computer-based application may automatically re-take one or more digital images, or a user may be instructed to do so. In at least one embodiment, an audio file may instruct, for example, "Take a photo of the vintner name on the label including the top edge of the label in your photo."

After successfully processing the anchor digital image data, the user or computer-based application may query the repository (e.g., database) to determine certain parameters associated with the authentication region (e.g., the offset to the authentication region, the size of the authentication region, the orientation of the authentication region, and other parameters). If the anchor digital image data does not have the authentication region in view, the system instructs the user to capture at least one digital image of both the vintner's name and the area of the label around the vintner's name at the same time. When the one or more digital images are captured, and when the vintner's name is sufficiently clear, the authentication region may optionally be isolated by a template. After the optional isolation of the authentication region, feature vectors are extracted and generated one or more digital fingerprints are compared with data in various records of the reference repository (e.g., database) to determine the authenticity of the bottle of wine. Because both the name and the authentication region are at the same part of the curve of the bottle, if one of the name and the authentication region is correctly imaged, so is the other. Just as there can be more than one anchor region, which may be used in concert or separately, there can also be more than one authentication region. In at least one embodiment, a first authentication region is located on the wine bottle label and a second authentication region is located on the wine bottle capsule.

In this example of FIGS. 1 and 2, all parts of the Label 2 underwent the same distortion. The authentication region underwent the very same distortion as the anchor region, and the distortion is therefore the same for both regions, relative to each other. When comparing the data in the regions, or otherwise processing the image data, the location of the authentication region relative to the determined information about the anchor region, will yield the same relative relationship that was present in the flat label.

Another illustrative example relates to the authentication of identity documents. When authenticating a passport or other identity card, for example, it is insufficient to simply find an area on the physical object (i.e., the identity document) that successfully authenticates. It is insufficient, for example, to authenticate the whole document by simply authenticating a region of the background because such singular authentication is not sufficient to ascertain that an original photograph has not been replaced by another. A passport, for example, is only legitimate when a plurality of determined regions (e.g., photograph, background, signature, serial number, place and date of issue) are authenticated separately, shown to match the original, and when the plurality of authenticated areas are also located in a specified physical relationship to each other. To achieve complete authentication of the identity document, therefore, the authentication system, device, and method should adequately capture sufficiently clear digital images of all of the determined regions, apply a properly scaled and oriented template to the digital images, and authenticate the regions both individually and as a group. With a handheld imaging device (e.g., smartphone, wearable computer, tablet computer, or the like), it might be difficult to properly align and set the distance for the imaging means without help.

The following example, which uses the teachings of this disclosure to authenticate a passport, is now described. At authentication, the entire photo page of the passport was adequately captured in one or more digital images using, for example, a high-resolution scanner. The serial number of the passport was set as the anchor region, and one or more resolution requirements for that anchor region were determined. A template was created containing the anchor region (e.g., the serial number) and the authentication regions (e.g., the photo, the signature, the expiration date, and the serial number). Also determined were the criteria that a user, a computer-based application, or a user cooperating with a computer-based application will later use to determine whether one or more digital images of the anchor region are adequately captured. These criteria might include, for example, whether the serial number or other text on the purported passport document can be read with OCR, whether there are, for example, ten (10) pixels across the average stroke, or by many other means. Once the authentication regions are templated, authentication feature vectors are extracted, and all relevant data (e.g., the template, the feature vectors, the serial number, and possibly other recognized text) are added to a record in a reference repository (e.g., database). The size and orientation of the anchor region data is also captured in at least one digital image to enable scale and rotation corrections to be made at authentication.

Later, after the passport has been in possession and use of its owner, one or more digital images of the same page of the passport are captured.

Because the entire page is imaged, there is no need in this embodiment to instruct the user regarding details (e.g., location, size, orientation, and the like) of the anchor region or authentication region. If necessary, the user or the computer-based application finds the anchor region and changes parameters (e.g., scale, orientation, illumination, focus, and the like) of the scanning means to meet the specified requirements to adequately capture digital images. The template is applied, and the authentication regions are found. Any suitable number of feature vectors are extracted from the authentication regions and compared to data in one or more records of the repository (e.g., database). A result is returned.

Figure 3:
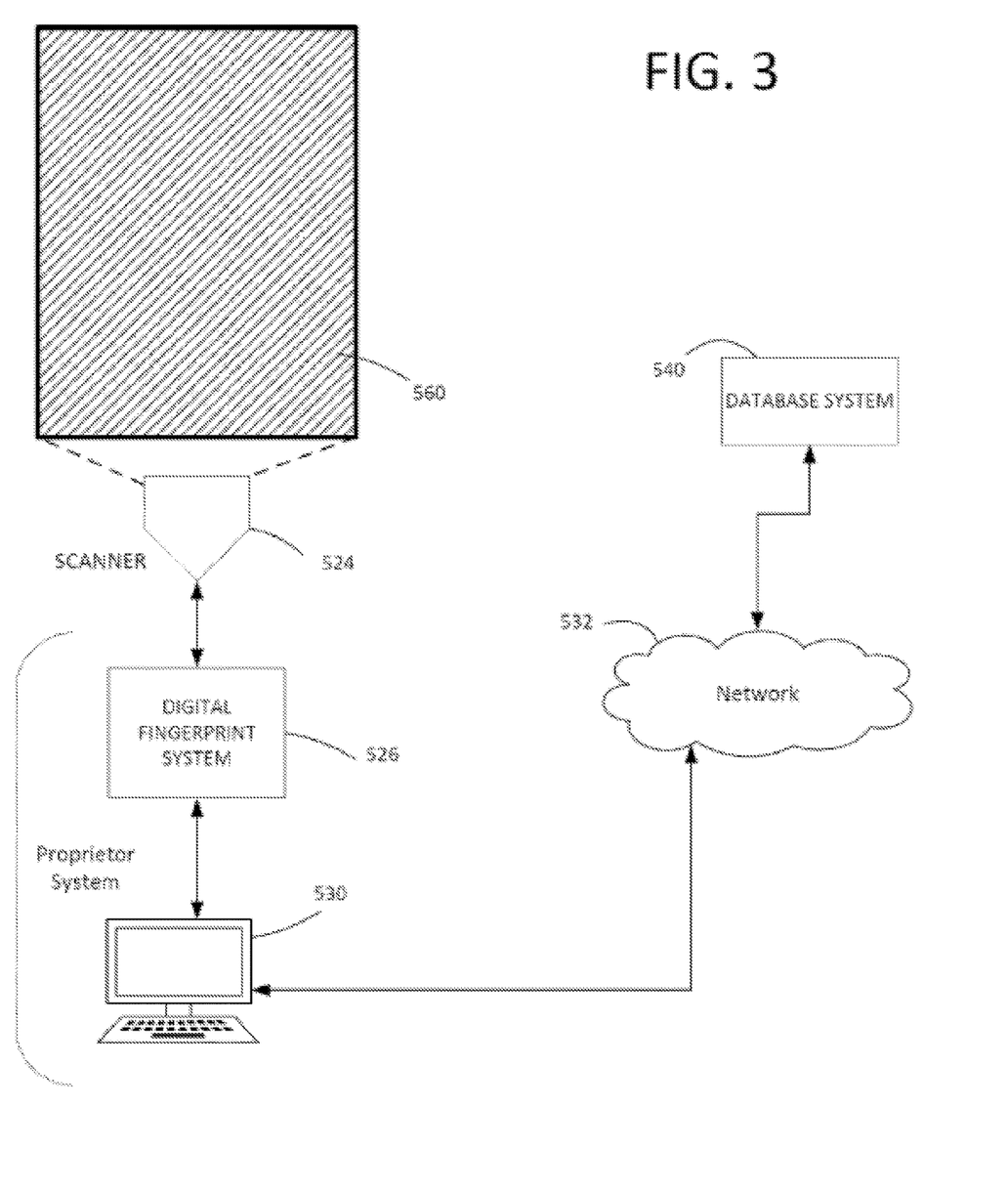
FIG. 3 is a system for inducting physical objects to extract one or more authentication regions.

FIG. 3 is a system for inducting a physical object 560 and or authentication regions of the physical object 560 into a digital fingerprint repository via a digital fingerprint system 526. In some cases, the digital fingerprint repository is arranged as a local database. In other cases, the digital fingerprint repository is arranged as a remote database system 540. The digital fingerprint repository includes a processor and a data store. The digital fingerprint repository, via the processor, may be interrogated, queried, loaded, updated, or otherwise interacted with using any acceptable protocol such as structured query language.

Digital repository records of the digital fingerprint repository are accessible via a computing system (e.g., a computing server 530 or other computing device), wherein information (e.g., digital fingerprints, characterization data, authentication region data, testing protocol data, provenance data, authentication data, feature data, certificate data, most recent authentication data, transaction history data, and other such data), is passed via a network 532 (e.g., a local area network (LAN), a wide area network (WAN) such as the Internet, or some other network).

An induction process is illustrated in a simplified diagram. In this embodiment, a proprietor or other user may possess a physical object 560. The physical object 560 may be for example, a wine bottle as shown in FIGS. 1-2, a passport, or any other physical object. A scanner 524 may be arranged to scan portions of the physical object 560 to capture digital image data or one or more authentication regions. The digital fingerprint system 526 may then process the digital image data to determine the quality of the digital image data, extract one or more authentication regions from the digital image data, generate a digital fingerprint based on the digital image data, and or authenticate a physical object using the one or more authentication regions and or the digital fingerprint. The digital fingerprint system may use the digital image data of the authentication regions to authenticate the physical object, by for example, forming digital fingerprints that identify the physical object and or matching one or more authentication regions and or digital fingerprints from currently captured digital image data with a reference authentication region and or digital fingerprint stored in, for example, the digital fingerprint repository on the database system 540. The scanner 524 and or digital fingerprint system 526 may be integrated into a proprietor system 530. The proprietor system 530 may be any user device, for example, a smartphone or other mobile device, a tablet, a personal computer, a laptop computer, a computer server, a cloud computing system, and the like. In examples where the proprietor system 530 is a mobile device, the mobile device may be a smartphone having an integrated scanner 524 (e.g., a build-in camera), a processor, and memory, for executing one or more instances of the digital fingerprint system 526 implemented in, for example, one or more clients, applications of other software systems.

Figure 4:
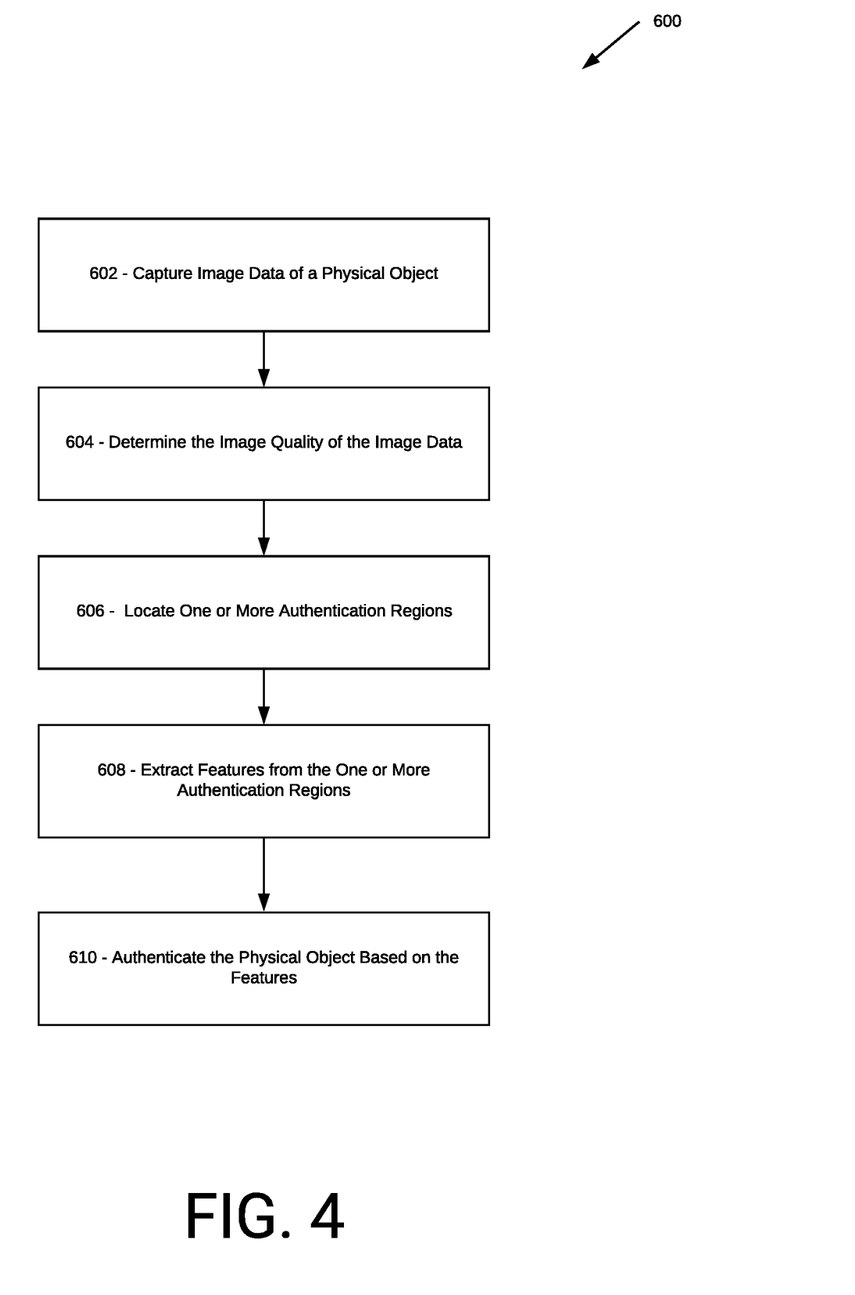
FIG. 4 is a method for locating one or more authentication regions of a physical object.

FIG. 4 illustrates an exemplary authentication method for locating one or more authentication regions of a physical object. At 602, the scanner may capture digital image data of one or more portions of a physical object. The digital image data may include one or more portions of the physical object having an anchor region. An anchor region may include, for example, a label of a wine bottle or other area of an object used to identify the object. At 604, the quality of the captured digital image data may be determined based on one or more quality metrics as described above. A level of image quality for the digital image data may be determined by comparing the one or more metrics to a predetermined threshold. At 606, one or more authentication regions may be located within the digital image data. To locate the one or more authentication regions, the digital image data of the anchor region may be analyzed to determine if the digital image data includes sufficient digital image data of the authentication region. If the digital image data does not includes sufficient digital image data of the authentication region, additional authentication region digital image data may be captured by the scanner. If the digital image data includes sufficient digital image data of the authentication region, authentication region may be located by accessing a data store based on the anchor region included in the digital image data to obtain offset information and locating the authentication region in the captured digital image data based on the offset information. Once the one or more authentication regions are located, one or more features may be extracted from the authentication regions at 608. A digital fingerprint of the physical object may then be generated based on the one or more features. At 610, the physical object may be authenticated based on the one or more features and or the digital fingerprint.

Additional Considerations

The systems, methods, and devices (i.e., the teaching) of the present disclosure can be distinguished from both ordinary templating and from the use of registration marks. Templating, as the term is used herein, informs a human user or computer-based application where relevant data may be extracted from one or more digital images. Registration marks merely show a user how to align and scale the imaged region, or how to clip a larger image. Neither ordinary templating nor registration marks teach the specific component of using one region, for which it is easy to determine whether the region is adequately captured, to ensure with acceptable confidence that another region, which may or may not be distinguishable by the naked eye in any way, is adequately captured.

In the embodiments taught herein, there may be one or more anchor regions, one or more authentication regions, or both on a physical object. There may or may not be feedback to a user or to a computer-based application as to whether the anchor region and the authentication region are all in view. Feedback is not be needed, for example, in cases where the anchor region is in fact also the authentication region.

Many different means for determining that the anchor region is adequately captured are taught and still others are contemplated. Several methods suggest themselves, among which are a resolution pattern that is focused until a certain resolution is found, a bar code (e.g., a UPC code) is imaged such that the bar code is both readable and has a certain number of pixels across a stroke, a logo where features within the logo are resolved, and a label (e.g., an "AUTHENTICATED BY ALITHEON" or other label) is formed in type sufficiently small that, if it is readable, authentication is highly likely to work.

Several different methods of capturing digital images and making use of one or both of the anchor regions and the authentication regions of interest are taught and still others are contemplated. Whatever system, device, or method is used to capture digital images and process the one or more anchor regions, providing good results are achieved, then those systems, devices, and methods should also be capable of adequately capturing the one or more authentication regions of interest or providing the user or a computer-based application with a means for also adequately capturing the one or more authentication regions of interest for authentication to be performed.

Any suitable type of authentication can be used. SIFT, SURF, and numerous others will work well.

Once a suitable digital fingerprint of an object is generated, the digital fingerprint may be stored or "registered" in a repository such as a database. For example, in some embodiments, the digital fingerprint may comprise one or more fingerprint features, which are stored as feature vectors. The repository should be secure. In some embodiments, a unique identifier (ID) such as a serial number also may be assigned to an object. An ID may be a convenient index in some applications. However, such an ID is not essential, as a digital fingerprint itself can serve as a key for searching a repository. In other words, by identifying an object by the unique features and characteristics of the object itself, identifiers, labels, tags, etc., become unnecessary to an authentication of the object.

Because in many of the cases described herein features are extracted from images produced under variable lighting conditions, it is unlikely to a determined and acceptable statistical certainty (e.g., less than 20% chance, less than 1% chance, less than 0.01% chance, less than $(1\times10^{\wedge}(-10))$ chance, or some other value) that two different "reads" will produce the exact same digital fingerprint. In a preferred embodiment, the system is arranged to look up and match items in the database when there is a "near miss." For example, two feature vectors, [O, 1, 5, 5, 6, 8] and [O, 1, 6, 5, 6, 8], are not identical, but by applying an appropriate difference metric, the system can determine that the two feature vectors are close enough to confirm to an acceptable level of certainty that they are from the same item that has been digitally fingerprinted or inducted before. One example is to calculate Euclidean distance between the two vectors in multi-dimensional space and compare the result to a threshold value. This is similar to the analysis of human fingerprints. Each fingerprint taken is slightly different, but the identification of key features allows a statistical match with an acceptably high degree of certainty.

Hardware and Software

At least some of the structures (e.g., devices, apparatus, systems and the like) discussed herein comprise electronic circuits and other hardware along with associated software. For example, a conventional portable device (e.g., mobile phone, smartphone, tablet, wearable computer, Internet of Things ("IoT") device, and other such computing devices) is likely to include one or more processors and software executable on those processors to carry out the operations described. The term software is used herein in its commonly understood sense to refer to programs or routines (e.g., subroutines, objects, plugins, etc.), as well as data, usable by a machine or processor. As is well known, computer programs generally comprise instructions that are stored in tangible, non-transitory machine-readable or computer-readable, storage media. Some embodiments of the present disclosure may include executable programs or instructions that are stored in machine-readable or computer-readable storage media, such as a digital memory. One of skill in the art will recognize that a computer, in the conventional sense, is not required in any particular embodiment. For example, various processors, embedded or otherwise, may be used in equipment taught in the present disclosure.

Memory for storing software is well known. In some embodiments, memory associated with a given processor may be stored in the same physical device as the processor (i.e., on-board memory); for example, RAM or FLASH memory disposed within an integrated circuit microprocessor or the like. In other examples, the memory comprises an independent device, such as an external disk drive, storage array, or portable FLASH key fob. In such cases, the memory becomes associated with the digital processor when the two are operatively coupled together, or in communication with each other, for example by an 1/0 port, a communication bus, network connection, etc., such that the processor can read information (e.g., a file) stored on the memory. Associated memory may be read-only memory by design (ROM) or by virtue of permission settings, or not. Other examples include, but are not limited to, WORM, EPROM, EEPROM, FLASH, etc. Those technologies often are implemented in solid state semiconductor devices such as integrated circuits. Other memories may comprise moving parts, such as a conventional rotating disk drive. All such memories are machine readable, computer-readable, or another like term, and all such memories may be used to store executable instructions for implementing one or more functions described herein.

A software product refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. Those of ordinary skill in the art recognize that software can be distributed via electronic transmission (e.g., download), in which case there will at least sometimes be a corresponding software product at the transmitting end of the transmission, the receiving end of the transmission, or both the transmitting and receiving ends of the transmission.

As described herein, for simplicity, a user of the devices, systems, and methods may in some cases be described in the context of the male gender. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

Unless defined otherwise, the technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The embodiments as taught in the present disclosure provide several technical effects and advances to the field of authentication, identification, tracking, and many other fields as apparent to those of skill in the art. Technical effects and benefits include the ability to locate an obscure, nondescript authentication region on a physical object based on a more prominent anchor region on the physical object. These and other technical effects are implemented with scanning technology, digital image processing technology, and other computing technology.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a scanner arranged to capture first digital image data representing an image of a first region of a physical object positioned within view of the scanner;
   a reference datastore;
   a processor configured to communicate over at least one network;
   a machine-readable memory accessible to the processor, the machine-readable memory storing processor-executable instructions and data, wherein the processor is configured to perform operations responsive to execution of the processor-executable instructions stored in the machine-readable memory, the operations including:

processing the first digital image data to locate an anchor region in the first region of the first digital image data;

assessing a first quality metric of the first digital image data of the located anchor region;

in a case that the first quality metric of the first digital image data of the located anchor region satisfies a predetermined threshold, accessing the reference datastore based on data of the anchor region to obtain first offset information that locates an authentication region in the first digital image data;

in a case that the first quality metric fails to satisfy the predetermined threshold:

automatically re-imaging the first region to capture re-imaged first digital image data of the located anchor region or providing instructions for capture of second digital image data of the located anchor region;

assessing a second quality metric of at least one of the re-imaged first digital image data of the located anchor region or the second digital image data of the located anchor region; and in a case that the second quality metric satisfies the predetermined threshold, accessing the reference datastore based on data of the anchor region to obtain second offset information that locates the authentication region in the re-imaged first digital image data of the located anchor region or the second digital image data of the located anchor region;

identifying the authentication region in the first digital image data, the re-imaged first digital image data, or the second digital image data based on the first offset information or the second offset information; and if the authentication region is identified, authenticating the physical object based on information extracted from the authentication region of the first digital image data, the re-imaged first digital image data, or the second digital image data.

2. The system of claim 1, wherein the processor that authenticates the physical object is further configured to perform operations for:

generating at least one digital fingerprint using data extracted from the authentication region;

querying the reference datastore based on the at least one digital fingerprint to obtain an authentication result; and causing an output representing the authentication result to be displayed on an electronic display or storing the authentication result in the machine-readable memory.

3. The system of claim 1, wherein the processor that automatically re-images the first region or provides instructions for capture of second digital image data is further configured to perform operations for:

electronically displaying feedback to a user of the scanner to re-image the physical object using the scanner or using another scanner; and transmitting a machine instruction to the scanner.

4. The system of claim 3, wherein the machine instruction transmitted from the processor to the scanner includes at least one of: a first command to switch to infrared, a second command to apply a mask to captured image data, and a command to switch to plenoptic mode.

5. The system of claim 3, wherein acquisition of re-imaged digital data is associated with a first configuration of the scanner, and wherein the machine instruction includes a command to utilize a second different configuration to acquire the re-imaged digital data.

6. The system of claim 1, wherein the processor is further configured to perform the operations of:

in a case that the authentication region is not in view in the first digital image data, the re-imaged first digital image data, or the second digital image data, generating feedback for at least one of the scanner or a user of the scanner to obtain, based on the first offset information or the second offset information, next digital image data representing an image of a second region of the physical object to include a location of the authentication region.

7. The system of claim 6, wherein the processor is further configured to perform the operations of:

processing the next digital image data to locate the authentication region; and authenticating the physical object based on the next digital image data of the located authentication region.

8. The system of claim 6, wherein the processor is further configured to perform the operations of:

processing the next digital image data to locate a second anchor region in the image of the second region;

assessing a third quality metric of the next digital image data of the second anchor region; and in a case that the third quality metric of the next digital image data of the located second anchor region fails to satisfy a second predetermined threshold, automatically re-imaging the second region or providing instructions for capture of third digital image data of the located second anchor region.

9. The system of claim 1, wherein the first quality metric comprises at least one of: clarity of focus of a portion of the first digital image data corresponding to the located anchor region, an illumination of the portion of the first digital image data corresponding to the located anchor region, a size of the portion of the first digital image data corresponding to the located anchor region, or an orientation associated with the portion of the first digital image data corresponding to the located anchor region.

10. The system of claim 1, wherein the physical object is a bottle of wine.

11. The system of claim 1, wherein the physical object is a passport.

* * * * *